(12) United States Patent
Hayes, Jr.

(10) Patent No.: US 7,953,803 B2
(45) Date of Patent: May 31, 2011

(54) MULTIPLE LOGIN INSTANT MESSAGING

(75) Inventor: Kent Fillmore Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 11/349,805

(22) Filed: Feb. 8, 2006

(65) Prior Publication Data

US 2007/0185967 A1 Aug. 9, 2007

(51) Int. Cl.
*G06F 15/16* (2006.01)

(52) U.S. Cl. ........ 709/206; 709/204; 709/207; 709/227; 709/229; 370/352; 370/395.2; 726/3

(58) Field of Classification Search .................. 709/228, 709/204–207, 223–227; 726/3; 370/352–395.2
See application file for complete search history.

(56) References Cited

U.S. PATENT DOCUMENTS

| | | | | |
|---|---|---|---|---|
| 6,055,575 A * | 4/2000 | Paulsen et al. | ................. | 709/229 |
| 6,212,548 B1 * | 4/2001 | DeSimone et al. | ........... | 709/204 |
| 6,430,604 B1 * | 8/2002 | Ogle et al. | ..................... | 709/207 |
| 7,356,567 B2 * | 4/2008 | Odell et al. | .................... | 709/206 |
| 7,549,924 B2 * | 6/2009 | Canessa et al. | ................ | 463/42 |
| 7,660,904 B2 * | 2/2010 | Qureshi et al. | ................ | 709/229 |
| 2002/0032770 A1 * | 3/2002 | Fertell et al. | .................... | 709/224 |
| 2003/0131061 A1 * | 7/2003 | Newton et al. | ................. | 709/206 |
| 2003/0177191 A1 * | 9/2003 | Kawashima et al. | ......... | 709/206 |
| 2004/0068567 A1 * | 4/2004 | Moran et al. | .................. | 709/227 |
| 2004/0249926 A1 * | 12/2004 | Cheng et al. | .................. | 709/223 |
| 2005/0102365 A1 | 5/2005 | Moore et al. | | |
| 2005/0149630 A1 * | 7/2005 | Smolinski et al. | ............ | 709/227 |
| 2006/0149818 A1 * | 7/2006 | Odell et al. | .................... | 709/206 |
| 2006/0212519 A1 * | 9/2006 | Kelley et al. | .................. | 709/206 |
| 2006/0218624 A1 * | 9/2006 | Ravikumar et al. | ............... | 726/3 |
| 2006/0259555 A1 * | 11/2006 | Hassounah et al. | ........... | 709/206 |
| 2007/0094490 A1 * | 4/2007 | Lohr | .............................. | 713/153 |
| 2007/0237154 A1 * | 10/2007 | Kalinichenko et al. | ..... | 370/395.2 |
| 2008/0189374 A1 * | 8/2008 | Odell et al. | .................... | 709/206 |
| 2009/0125591 A1 * | 5/2009 | Kirkpatrick | .................... | 709/206 |

FOREIGN PATENT DOCUMENTS

| | | |
|---|---|---|
| EP | 001489800 A1 * | 12/2004 |
| EP | 1507420 A1 | 2/2005 |
| JP | 02006127301 A * | 5/2006 |

OTHER PUBLICATIONS

Anti-cyberstalking: the Predator and Prey Alert (PAPA) system Aggarwal, S.; Burmester, M.; Henry, P.; Kermes, L.; Mulholland, J.; Systematic Approaches to Digital Forensic Engineering, 2005. First International Workshop on Nov. 7-9, 2005 pp. 195-205.* Efficient Internet Chat Services for Help Desk Agents Zon-Yin Shae; Garg, D.; Bhose, R.; Mukherjee, R.; Guven, S.; Pingali, G.; Services Computing, 2007. SCC 2007. IEEE International Conference on Digital Object Identifier: 10.1109/SCC.2007.54 Publication Year: 2007 , pp. 589-596.*
A field study of use of synchronous chat in online courses Spencer, D.H.; Hiltz, S.R.; System Sciences, 2003. Proceedings of the 36th Annual Hawaii International Conference on Digital Object Identifier: 10.1109/HICSS.2003.1173742 Publication Year: 2003.*
Mobile Instant Messaging Service Over Cellular Networks Naor, Z.; Global Telecommunications Conference, 2007. GLOBECOM '07. IEEE Digital Object Identifier: 10.1109/GLOCOM.2007.1008 Publication Year: 2007 , pp. 5319-5323.*

* cited by examiner

*Primary Examiner* — Wing F Chan
*Assistant Examiner* — Razu A Miah
(74) *Attorney, Agent, or Firm* — Steven M. Greenberg, Esq.; Carey, Rodriguez, Greenberg & Paul

(57) ABSTRACT

Mechanisms are provided for allowing users to log into an IM provider from multiple clients concurrently. The messages are recorded and messages from the same users originating form multiple clients are differentiated. The user may then follow the IM session from any client device from which the user has logged into the IM provider. Also, when logging into a new client device in a session, the user is provided a history of the IM session.

9 Claims, 10 Drawing Sheets

MULTIPLE LOGIN INSTANT MESSAGING

BACKGROUND OF THE INVENTION

1. Field of the Invention

The present invention relates generally to data processing and, more particularly, to instant messaging between clients in a network data processing system. Still more particularly, the present invention relates to a method, apparatus, and computer program product for multiple login for a user of instant messaging.

2. Description of the Related Art

Instant messaging involves exchanging messages in real-time between two or more people. Instant messaging (IM) requires that all participants be logged onto an IM service at the same time. Also known as a "chatting," IM has become very popular for both business and personal use. In business, IM provides a way to contact co-workers any time of the day, providing they are at their computers. Thus, IM is often used as a way to avoid telephone tag, whether the communication continues as text messages or winds up as a traditional phone call.

Electronic mail (e-mail) and instant messaging are often used in a similar manner, but e-mail is not real-time. Both e-mail and IM post messages to a server; however, an e-mail client generally retrieves messages from the server infrequently relative to an IM client, which is constantly polling the server for new message. Thus, with e-mail, there can be delays of several minutes or even hours. Like e-mail attachments, IM systems generally allow for file transfers. Also like e-mail, some IM systems allow users to send messages even if the recipient is not currently online. IM also allows users to communicate by speaking, rather than typing, if they have a headset attached to the client device. Therefore, IM is not necessarily limited to text-only communication.

Each user of an IM system has a unique identification, also referred to as a user name. In order to set up an instant message, a user typically adds the user names of the people with whom they want to communicate to a "buddy list," also known as a friends list or contact list. When a user logs on to the Internet with IM client software, other users may be instantly alerted. Similarly, when the user logs off, other users are also notified of this occurrence.

Instant messaging became popular after Israeli-based ICQ introduced its service in 1996, which was later acquired by America Online (AOL). AOL® Instant Messenger (AIM®), Microsoft Network MSN® Messenger/Windows® Messenger, and Yahoo!® Messenger are examples of widely used IM services. Still other companies provide IM programs that work with combinations of known services.

With the proliferation of computers into the personal lives and business environments of users, a user may have several client devices at his or her disposal. For instance, a user may have a laptop in the living room, an Internet appliance connected to the television, a desktop computer in the home office, and a telephone device with an IM client. A user may also have an IM client available in a video game console or personal digital assistant, for example. In fact, computer savvy users may even multiple computers sharing a single display through a display switcher. When a user switches between computing devices, the user must log off of the IM service on a first device and then log onto the IM service on a second device. The user must then re-establish the IM session with the other participants.

BRIEF SUMMARY OF THE INVENTION

The present invention recognizes the disadvantages of the prior art and provides a computer implemented method for multiple login instant messaging. A first user logs into a first client device for an instant messaging session. An instant messaging session history is recorded for the first user. Responsive to the first user logging into a second client device for the instant messaging session, the instant messaging session history is forwarded to the second client device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
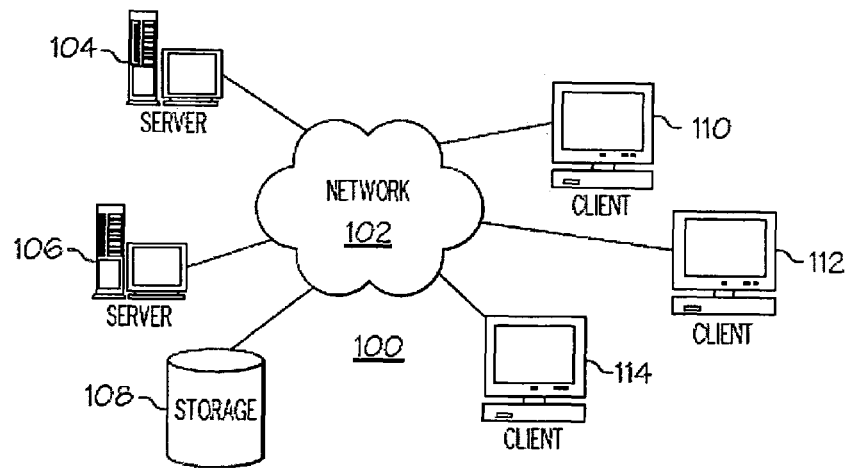
FIG. 1 depicts a pictorial representation of a network of data processing systems in which aspects of the present invention may be implemented.
Figure 2:
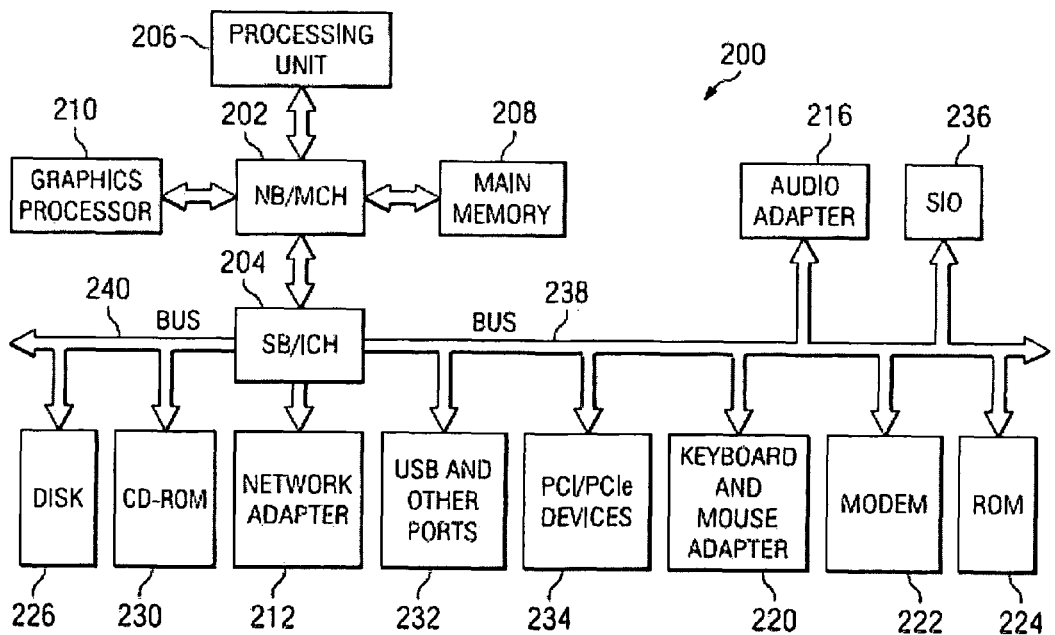
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, servers 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In accordance with exemplary aspects of the present invention, servers 104, 106 may provide instant messaging (IM) services. For example, server 104 may have instant messaging server software executing thereon. Clients 110, 112, 114 may have IM client software executing thereon. When a first user logs into IM client software on a client device, such as client 110, the client software sends the user information to server 104. User information may include, for example, a user name and password. Server 104 authenticates the user by checking the user information against a database, which may be stored in storage 108, for instance.

A second user may log into IM client software on another client device, such as client 112. The first and second user may communicate by sending messages to server 104. The messages may be stored in storage 108, for example. Each IM client polls server 104 to determine if new messages are available. An IM client, unlike an e-mail client, polls the server frequently. A typical polling interval for an IM client may be one second, for example. When a new IM message is available, the IM client software retrieves the message and presents the message to the user nearly instantaneously.

Today, a user may have several client devices at his or her disposal. For instance, client 112 may be a laptop computer in a user's living room and client 114 may be the user's telephone device. The user may wish to switch between client devices while continuing an IM session with other participants. In accordance with exemplary aspects of the present invention, a mechanism is provided for managing multiple logins for a user in an instant messaging system.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries, and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

In accordance with exemplary aspects of the present invention, IM sessions (or virtual IM sessions) are enabled on each of a user's client devices. From the perspective of the user, the same IM session is running on each of the client devices. The input entered by the user on any of the client devices and the associated responses from the other IM participants appear on all of the user's clients.

Figure 3:
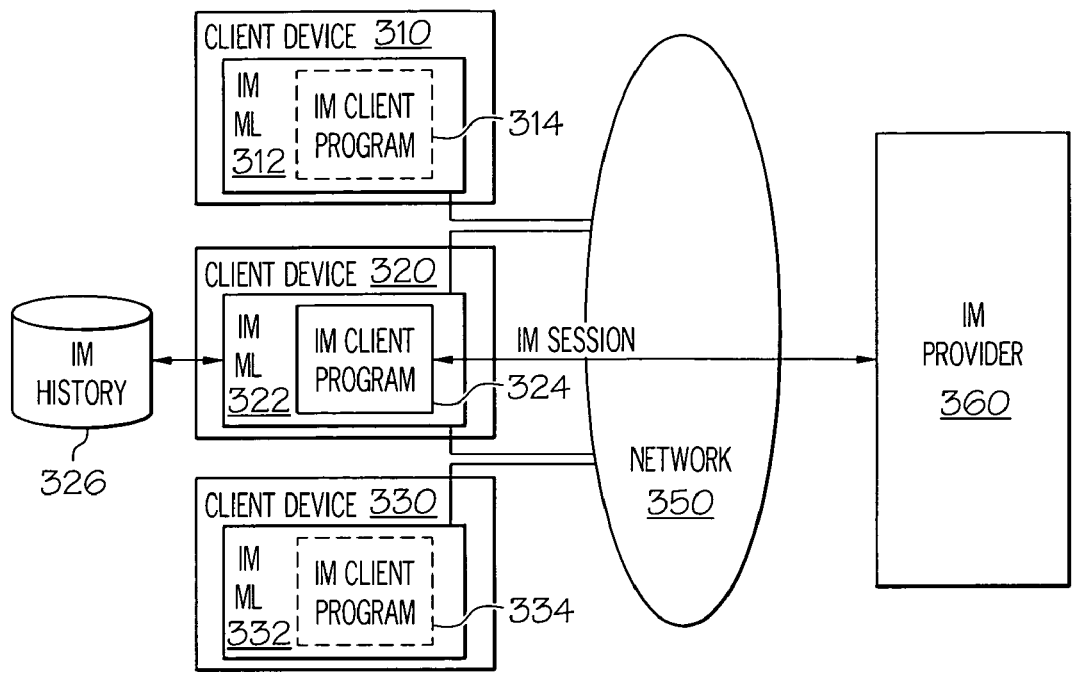
FIG. 3 is a block diagram illustrating a client based multiple login instant messaging system in accordance with an exemplary embodiment of the present invention.

FIG. 3 is a block diagram illustrating a client based multiple login instant messaging system in accordance with an exemplary embodiment of the present invention. IM provider 360 utilizes existing IM provider functionality. Client device 310 includes IM multiple login (ML) component 312, which works in conjunction with IM client program 314. Client device 320 includes IM ML component 322, which works in conjunction with IM client program 324. Client device 330 includes IM ML component 332, which works in conjunction with IM client program 334.

Client device 320 becomes the master and handles the interactions with IM provider 360. IM client program 324 on client device 320 communicates with IM provider 360 via network 350. Master IM ML component 322 passes information entered by the user of client device 320 and the other IM ML components 312, 332 to IM provider 360. Mater IM ML component 322 also passes data received from IM provider 360 for a session to IM ML components 312, 332.

In this configuration, IM client program 324 is the master and IM client programs 314 and 334 are slaves. All communication between the user and IM provider 360 is handled through master IM client program 324. IM ML components 312 and 332 redirect traffic through master IM ML component 322.

In addition, master IM ML component 322 may store IM history 326 for all of the user's clients. IM history 326 records the messages communicated to and from the user on all of the user's client devices. Thus, if the user logs into another client, the entire history may be passed to the new IM client. IM history 326 may also differentiate between the client devices.

Figure 4:
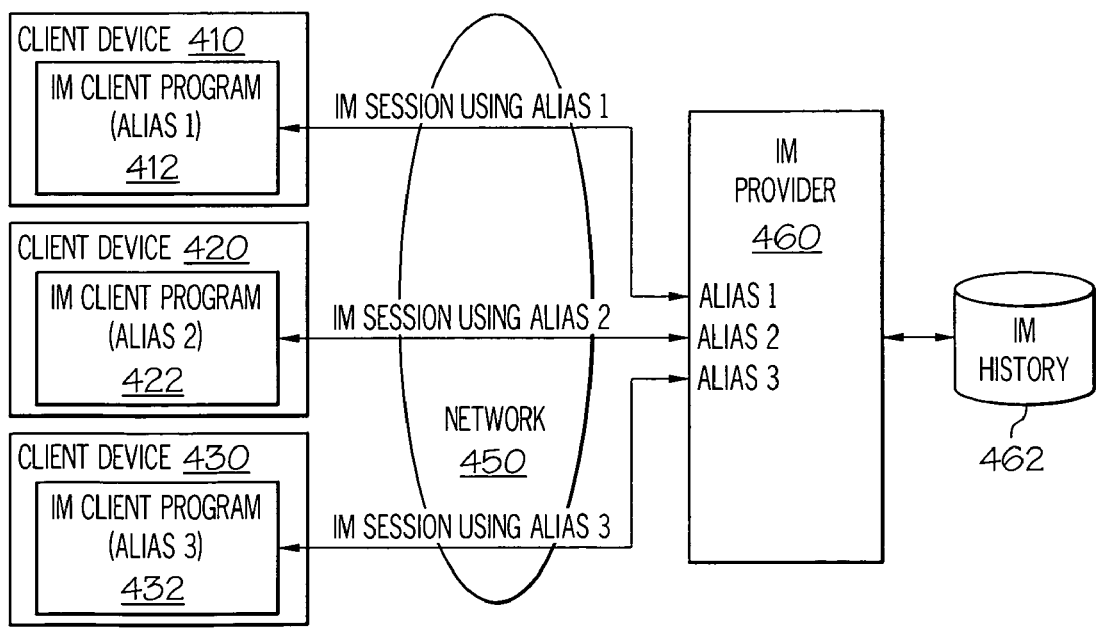
FIG. 4 is a block diagram illustrating a server based multiple login instant messaging system in accordance with an exemplary embodiment of the present invention.

FIG. 4 is a block diagram illustrating a server based multiple login instant messaging system in accordance with an exemplary embodiment of the present invention. Client device 410 includes IM client program 412. Client device 420 includes IM client program 422. Client device 430 includes IM client program 432. IM client programs 412, 422, 432 utilize existing IM client functionality.

In one example, a user establishes an IM session on client 410 using IM client program 412, which communicates with IM provider 460 using an alias, Alias 1 in the depicted example. An alias is a unique user ID that differentiates messages originating from client device 410 from messages originating from the same user at other client devices. IM provider 460 provides a real user name for the user, such as "username." Additionally, IM provider 460 enables a user to get multiple aliases, which IM provider 460 recognize as the user at a particular client device. For example, a user may enter an alias of "username-notebook" for one client device, an alias of "username-cell" for another client device, and an alias of "username-work" for a third client device.

In the depicted example, the user then establishes an IM session on client 420 using IM client program 422, which communicates with IM provider 460 using Alias 2. The user also establishes an IM session on client 430 using IM client program 432, which communicates with IM provider 460 using Alias 3. In this manner, each client device 410, 420, 430 communicates with IM provider 460 individually via network 450 using unique IDs (aliases), which IM provider 460 recognizes as the same user. IM provider 460 forwards messages from each client device to the other participating client device under the same user name. Also, when IM provider 460 receives a message intended for the user, IM provider 460 forwards the message to all client devices under the same user name.

In addition, IM provider 460 may store IM history 462 for all of the user's clients. IM history 462 records the messages communicated to and from the user on all of the user's client devices. Thus, if the user logs into another client, the entire history may be passed to the new IM client. IM history 462 may also differentiate between the client devices.

In an alternative embodiment, aliases may not be used. The clients may log into the same proxy server using the same user ID and password. The proxy server may differentiate the clients by IP address and/or client machine hostname.

Figure 5:
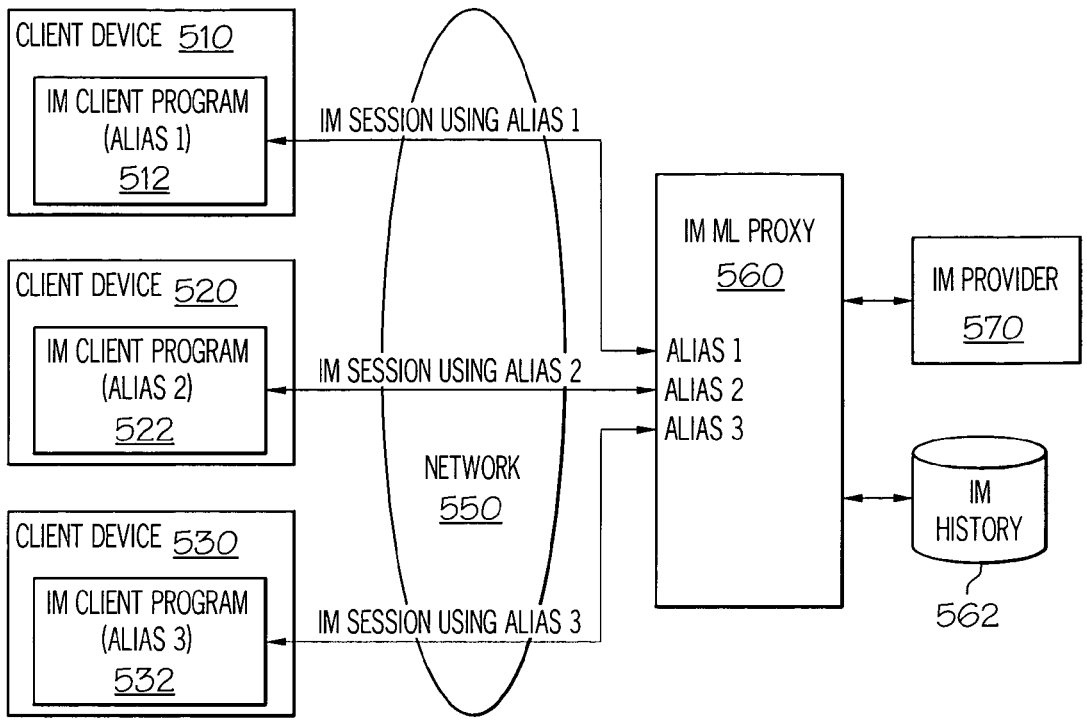
FIG. 5 is a block diagram illustrating a proxy based multiple login instant messaging system in accordance with an exemplary embodiment of the present invention.

FIG. 5 is a block diagram illustrating a proxy based multiple login instant messaging system in accordance with an exemplary embodiment of the present invention. Client device 510 includes IM client program 512. Client device 520 includes IM client program 522. Client device 530 includes IM client program 532. IM client programs 512, 522, 532 utilize existing IM client functionality.

In one example, a user establishes an IM session on client 510 using IM client program 512, which communicates with IM ML proxy 560 using an alias, Alias 1 in the depicted example. An alias differentiates messages originating from client device 510 from messages originating from the same user at other client devices. IM ML proxy 560 provides a real user name for the user, such as "username." IM proxy communicates with IM provider 570 using the real user name. Additionally, IM ML proxy 560 enables a user to get multiple aliases, which IM proxy 560 recognize as the user at a particular client device.

In the depicted example, the user then establishes an IM session on client 520 using IM client program 522, which communicates with IM ML proxy 560 using Alias 2. The user also establishes an IM session on client 530 using IM client program 532, which communicates with IM ML proxy 560 using Alias 3. In this manner, each client device 510, 520, 530 communicates with IM ML proxy 560 individually using unique IDs via network 450; however, client devices 510, 520, 530 effectively communicate, through IM ML proxy 460, with IM provider 570 using a uniform real user name.

IM ML proxy 560 forwards messages from each client device to the other participating client device under the same user name. Also, when IM ML proxy 560 receives a message intended for the user from IM provider 570, IM ML proxy 560 forwards the message to all client devices under the same user name.

In addition, IM ML proxy 560 may store IM history 562 for all of the user's clients. IM history 562 records the messages communicated to and from the user on all of the user's client devices. Thus, if the user logs into another client, the entire history may be passed to the new IM client. IM history 562 may also differentiate between the client devices.

In an alternative embodiment, aliases may not be used. The clients may log into the same IM provider using the same user ID and password. The IM provider may differentiate the clients by IP address and/or client machine hostname.

Figure 6:
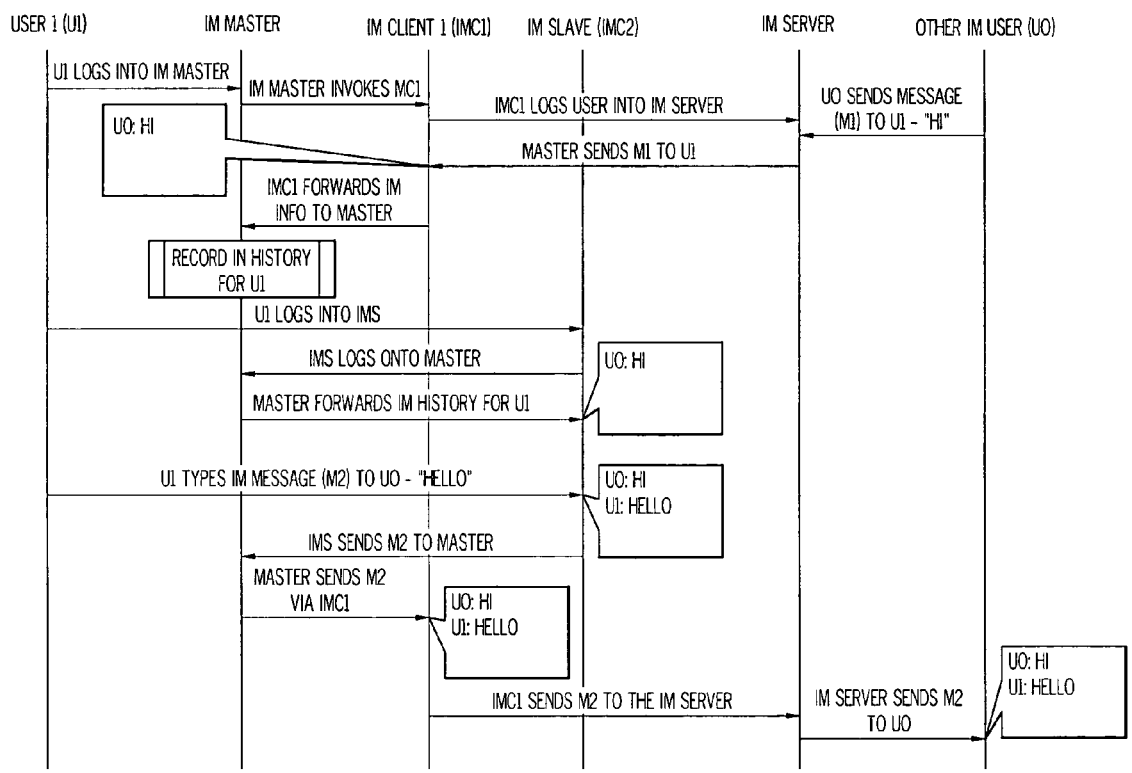
FIG. 6 is a data flow diagram illustrating an example of client based multiple login instant messaging in accordance with exemplary aspects of the present invention.

FIG. 6 is a data flow diagram illustrating an example of client based multiple login instant messaging in accordance with exemplary aspects of the present invention. User 1 (U1) logs into the ML IM master. Next, the ML IM master invokes IM client 1 (IMC1). IM client 1 logs into the IM server.

Next, other IM user (UO) sends a message (M1) to user 1, stating "Hi." The IM server sends the message to user 1 at IM client 1. IM client 1 presents the message to user 1. IM client 1 also forwards the message information to the IM master, which records the message information in an IM history for user 1.

Thereafter, user 1 logs into IM slave (IMS) at IM client 2 (IMC2). The IM slave logs into the IM master, and the IM master forwards the IM history for user 1 to IM client 2. In response to receiving the IM history, IM client 2 presents the previous messages to the user.

User 1 then types an IM message (M2) to the other user, stating "Hello." The IM slave sends the message, M2, to the IM master. In turn, the IM master sends the new message to IM client 1, and IM client 1 presents the new message to the user. In addition, IM client 2 sends the new message to the IM server, which then sends the message to the other user for presentation.

As seen in the data flow of FIG. 6, a user may log into a new client without terminating the IM session. Furthermore, since the master forwards the history to the new client device, the user need not worry about missing messages that occurred prior to logging into the new client device. Other participants may not even be aware that the user switched devices. However, in one exemplary embodiment, the IM history differentiates between the multiple logins for the user. This differentiation may also be made when the messages are presented to the operator. For example, the IM client may present the text of the user name and alias of each participant. As another example, the IM client may differentiate messages from the same user by presenting messages of different aliases using different colors.

Figure 7:
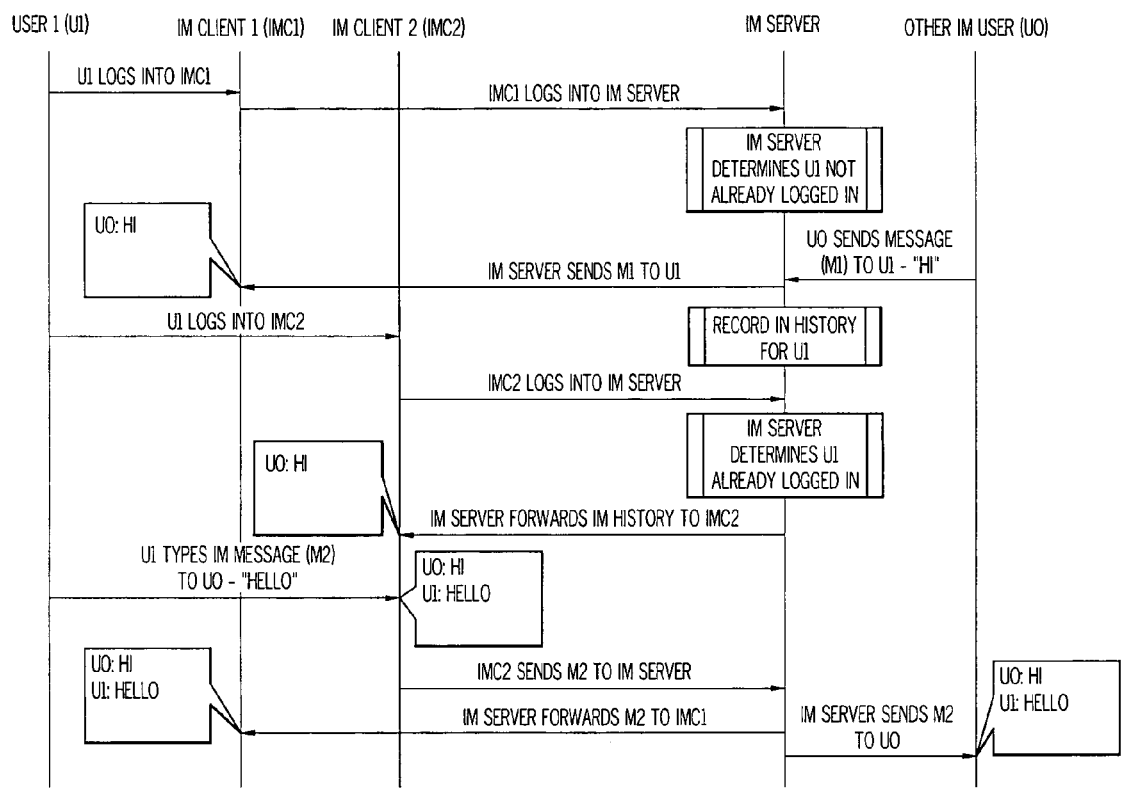
FIG. 7 is a data flow diagram illustrating an example of server based multiple login instant messaging in accordance with exemplary aspects of the present invention.

FIG. 7 is a data flow diagram illustrating an example of server based multiple login instant messaging in accordance with exemplary aspects of the present invention. User 1 (U1) logs into IM client 1, and IM client 1 logs into the IM server. The IM server determines that user 1 is not already logged in.

Next, other IM user (UO) sends a message (M1) to user 1, stating "Hi." The IM server sends the message to user 1 at IM client 1. IM client 1 presents the message to user 1. The IM server also records the message information in an IM history for user 1.

Thereafter, user 1 logs into IM client 2 (IMC2), and IM client 2 logs into the IM server. The IM server then determines that user 1 is already logged in and forwards the IM history for user 1 to IM client 2. In response to receiving the IM history, IM client 2 presents the previous messages to the user.

User 1 then types an IM message (M2) to the other user, stating "Hello." IM client 2 sends the message, M2, to the IM server. In turn, the IM server sends the new message to IM client 1, and IM client 1 presents the new message to the user. In addition, the IM server sends the message to the other user for presentation.

In the example depicted in FIG. 7, the IM server handles the multiple login functionality on behalf of the user. The user is able to log into multiple IM clients simultaneously. The IM server determines when the user is logged into multiple clients and coordinates the clients.

Figure 8:
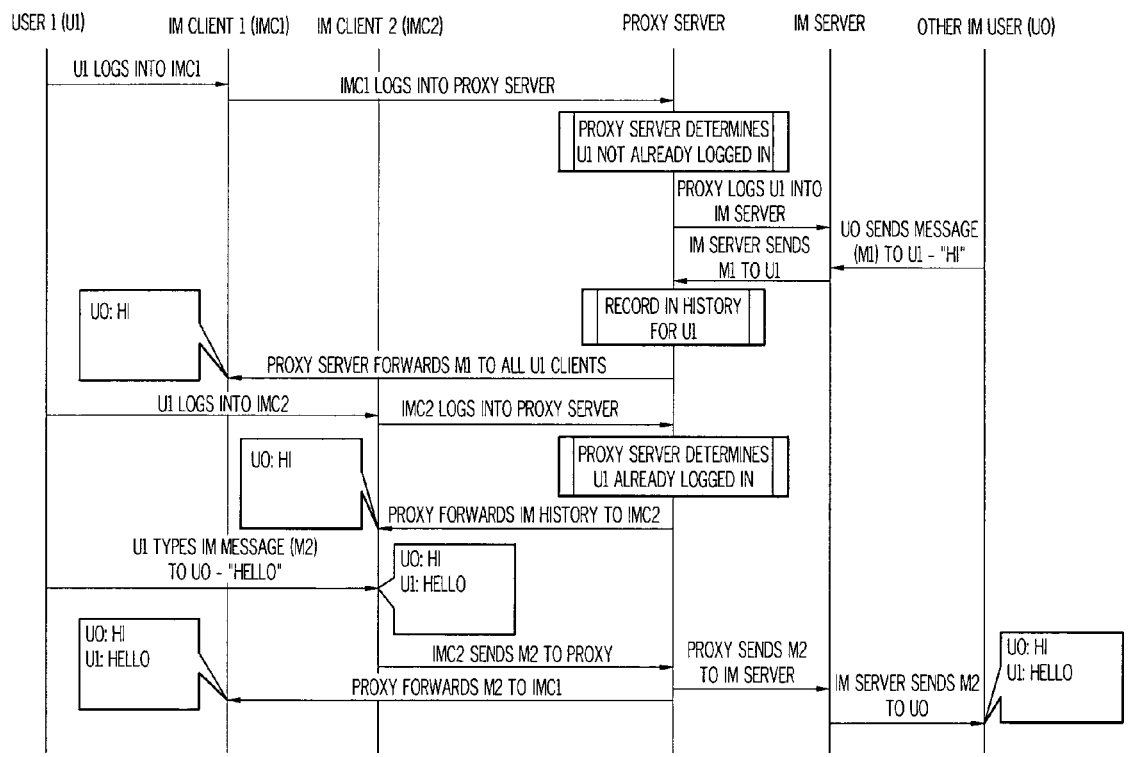
FIG. 8 is a data flow diagram illustrating an example of proxy based multiple login instant messaging in accordance with exemplary aspects of the present invention.

FIG. 8 is a data flow diagram illustrating an example of proxy based multiple login instant messaging in accordance with exemplary aspects of the present invention. User 1 (U1) logs into IM client 1, and IM client 1 logs into the IM proxy server. The IM proxy server determines that user 1 is not already logged in and logs user 1 into the IM server.

Next, other IM user (UO) sends a message (M1) to user 1, stating "Hi." The IM server sends the message to via the IM proxy server. IM proxy server records the message information in an IM history for user 1 and forwards the message to all user 1 clients, in this case IM client 1. IM client 1 presents the message to the user.

Thereafter, user 1 logs into IM client 2 (IMC2), and IM client 2 logs into the IM proxy server. The IM proxy server then determines that user 1 is already logged in and forwards the IM history for user 1 to IM client 2. In response to receiving the IM history, IM client 2 presents the previous messages to the user.

User 1 then types an IM message (M2) to the other user, stating "Hello." IM client 2 sends the message, M2, to the proxy server. In turn, the proxy server sends the new message to the IM server and IM client 1, and IM client 1 presents the new message to the user. The IM server, in turn, sends the message to the other user for presentation.

In the example depicted in FIG. 8, the IM proxy server handles the multiple login functionality on behalf of the user and on behalf of the IM provider. The user is able to log into multiple IM clients concurrently. The IM proxy determines when the user is logged into multiple clients and coordinates the clients. The IM provider functions as if the user is logged into a single client device.

Figure 9:
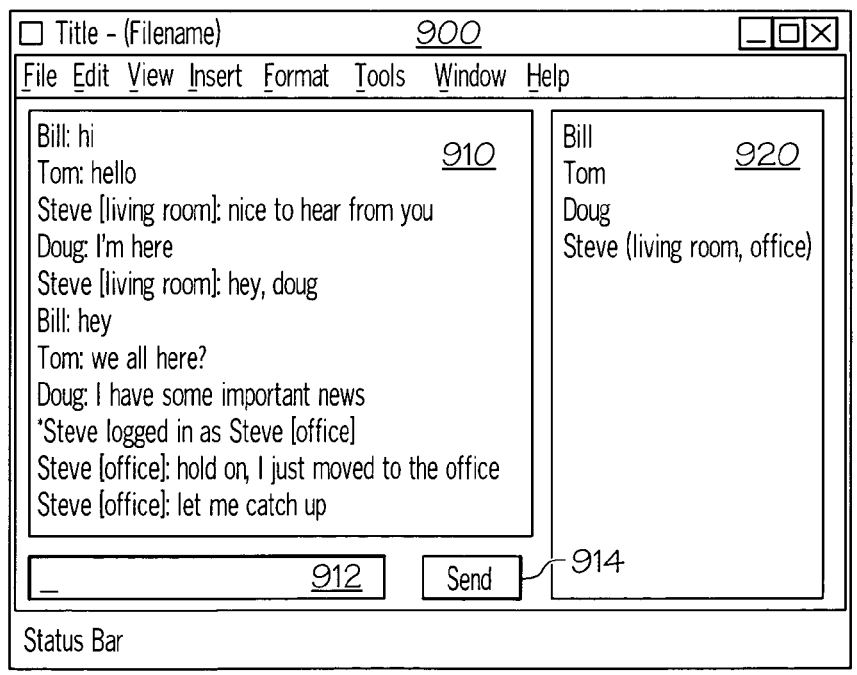
FIG. 9 is an example screen of display for an instant messaging client in accordance with exemplary aspects of the present invention.

FIG. 9 is an example screen of display for an instant messaging client in accordance with exemplary aspects of the present invention. IM client window 900 includes message display portion 910 and participant list section 920. Participant list section 920 lists the participants in the IM session. In this case, the user of the depicted IM client is Steve at the office client device. At the particular client device, the real user name is "Steve" and the alias is "office."

Messages may be typed into message entry field 912. The user instructs the IM client to send the message by selecting "Send" button 914. Messages display portion 910 presents the messages in the current IM session. In accordance with one exemplary embodiment, the user, Steve, logged into the "office" client device. The messages that occurred prior to logging into the current client device are presented in message display portion 910. Also, in accordance with an exemplary embodiment, the IM client software distinguishes between messages entered by the real user, Steve, at the "living room" client device and messages entered by the real user, Steve, at the "office" client device.

Figure 10A:
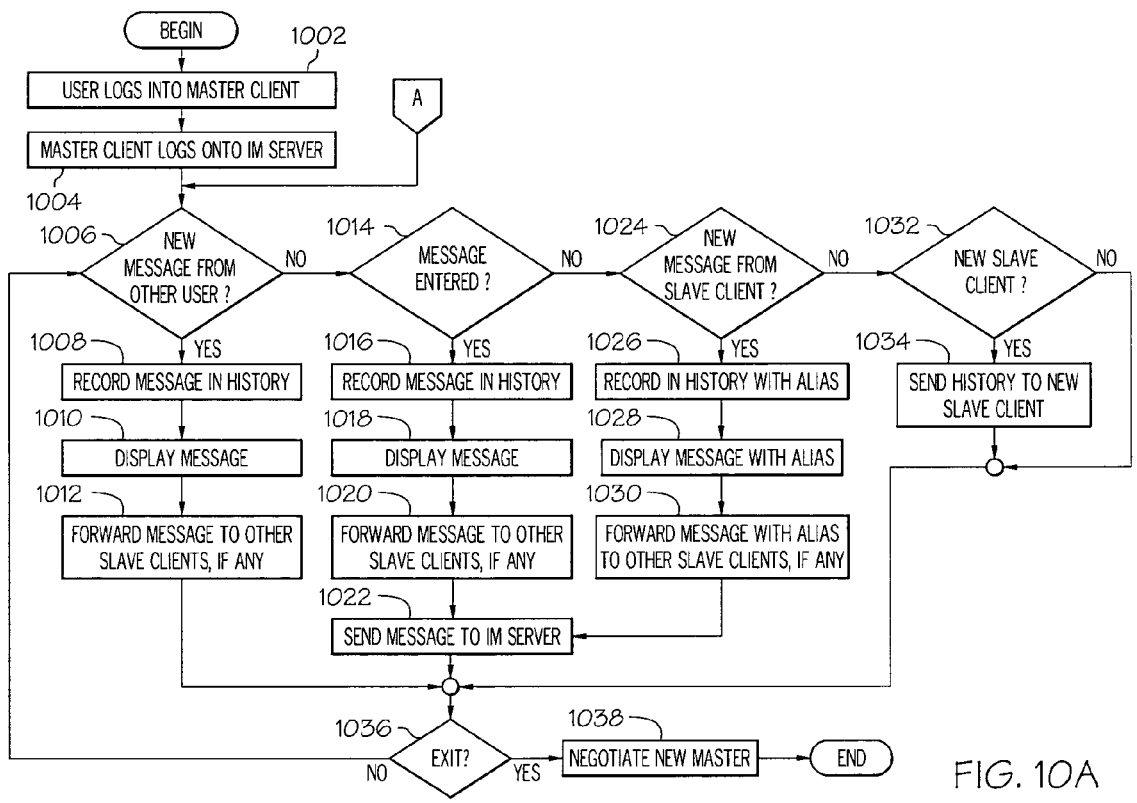
FIG. 10A is a flowchart illustrating operation of a master client in a client based multiple login instant messaging system in accordance with exemplary aspects of the present invention.
Figure 10B:
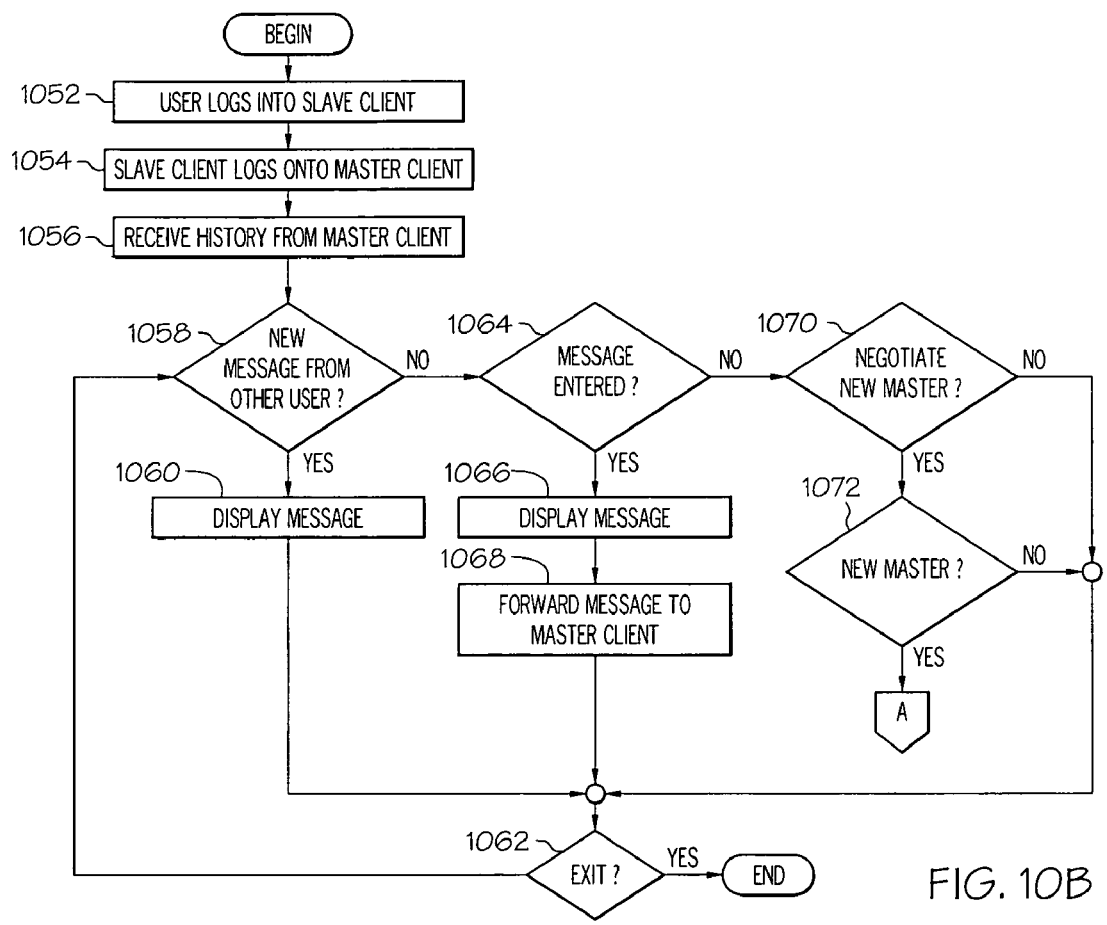
FIG. 10B is a flowchart illustrating operation of a slave client in a client based multiple login instant messaging system in accordance with exemplary aspects of the present invention.
Figure 11:
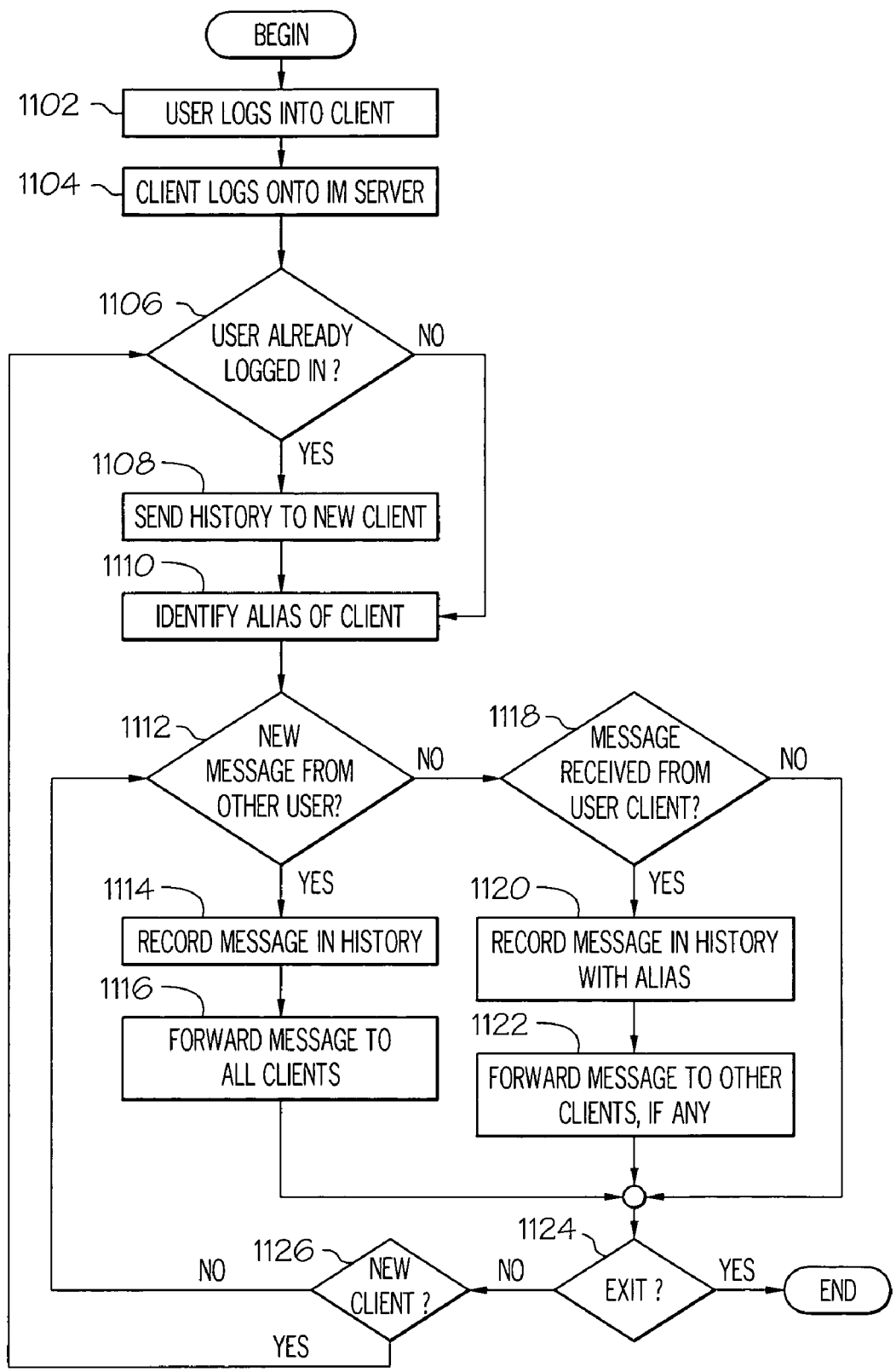
FIG. 11 is a flowchart illustrating operation of an instant messaging server in a server based multiple login instant messaging system in accordance with exemplary aspects of the present invention.
Figure 12:
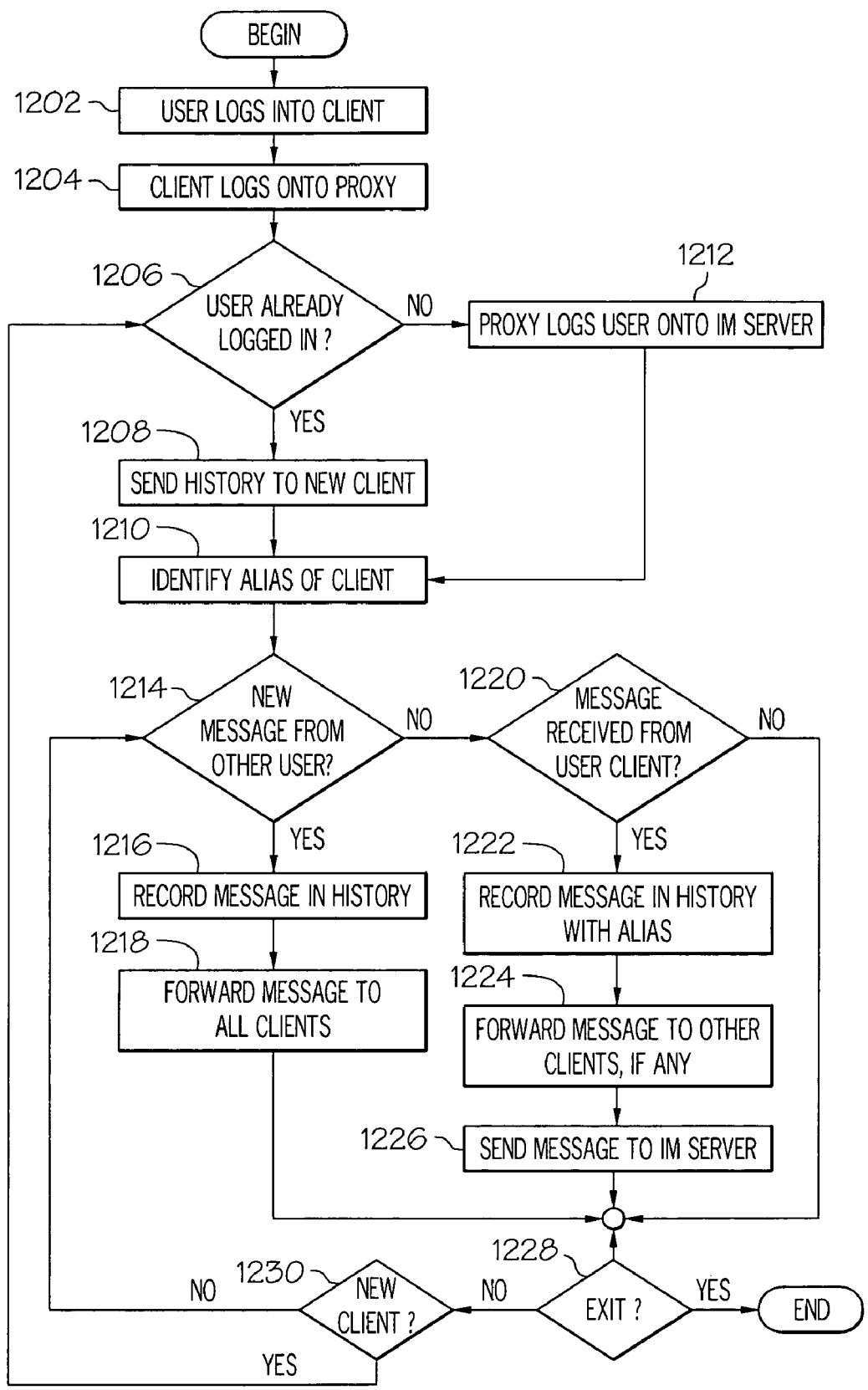
FIG. 12 is a flowchart illustrating operation of a proxy server in a proxy based multiple login instant messaging system in accordance with exemplary aspects of the present invention.

FIG. 10A is a flowchart illustrating operation of a master client in a client based multiple login instant messaging system in accordance with exemplary aspects of the present invention. FIG. 10B is a flowchart illustrating operation of a slave client in a client based multiple login instant messaging system in accordance with exemplary aspects of the present invention. FIG. 11 is a flowchart illustrating operation of an instant messaging server in a server based multiple login instant messaging system in accordance with exemplary aspects of the present invention. FIG. 12 is a flowchart illustrating operation of a proxy server in a proxy based multiple login instant messaging system in accordance with exemplary aspects of the present invention.

It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions that execute on the processor or other programmable data processing apparatus create means for implementing the functions specified in the flowchart block or blocks. These computer program instructions may also be embodied in a computer-readable memory, storage medium, or transmission medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and computer usable program code for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

With particular reference to FIG. 10A, operation of a master client in a client based multiple login instant messaging system is shown. Operation begins and the user logs into the master client (block 1002). The master client logs into the IM server (1004). Then, the master client determines whether a new message from another user is received (block 1006).

If the master client receives a new message from another user, the master client records the message in the IM session history (block 1008), displays the message to the user (block 1010), and forwards the message to other slave clients, if any (block 1012). Thereafter, operation proceeds to block 1036, where the master client determines whether an exit condition exists.

If the master client does not receive a new message from another user in block 1006, the master client determines whether a message is entered by the user (block 1014). If a message is entered by the user, the master client records the message in the IM session history (block 1016), displays the message in a display portion of a user interface (block 1018), and forwards the message to other slave clients, if any (block 1020). Then, the master client sends the message to the IM server (block 1222). Thereafter, operation proceeds to block 1036, where the master client determines whether an exit condition exists.

If a message is not entered by the user in block 1014, the master client determines whether a new message is received from a slave client (block 1024). If a new message is received from a slave client, the master client records the message in the IM session history (block 1026), displays the message to the user (block 1028), and forwards the message to other slave clients, if any (block 1030). Thereafter, operation proceeds to block 1036, where the master client determines whether an exit condition exists.

If a new message is not received from a slave client in block 1024, the master client determines whether the user has logged into a new slave client (block 1032). If the user has logged into another slave client, the master client sends the history to the new slave client (block 1034) and operation proceeds to block 1036 to determine whether an exit condition exists. If the user has not logged into a new slave client in block 1032, operation proceeds to block 1036 to determine whether an exit condition exists.

Turning to block 1036, an exit condition may be, for example, the user selecting to log off from the IM session, the user selecting to close the IM client application, or any other event that would cause the master client to terminate execution. If an exit condition exists in block 1036, the master client negotiates a new master, if necessary (block 1038) and operation ends; however, if an exit condition does not exist, operation returns to block 1006 to determine whether a new message is received from another user.

With reference now to FIG. 10B, operation of a slave client in a client based multiple login instant messaging system is shown. Operation begins and the user logs into the slave client (block 1052). The slave client logs onto the master client (block 1054) and receives the IM session history from the master client (block 1056). Then, the slave client determines whether a new message from another user is received (block 1058).

If the slave client receives a new message from another user, the slave client displays the message to the user (block 1060). Thereafter, operation proceeds to block 1062, where the slave client determines whether an exit condition exists.

If the slave client does not receive a new message from another user in block 1058, the slave client determines whether a message is entered by the user (block 1064). If a message is entered by the user, the slave client displays the message in a display portion of a user interface (block 1066) and forwards the message to the master client (block 1068). Thereafter, operation proceeds to block 1062, where the slave client determines whether an exit condition exists.

If a message is not entered by the user in block 1064, the slave client determines whether there is a negotiation for a new master client (block 1070). If there is a negotiation for a new master client, the slave client determines whether it is the new master (block 1072). If the slave client is the new master, operation proceeds to block 1006 of FIG. 10A. If there is not a negotiation for a new master in block 1070 or the slave client is not the new master in block 1072, operation proceeds to block 1062 to determine whether an exit condition exists.

Turning to block 1062, an exit condition may be, for example, the user selecting to log off from the IM session, the user selecting to close the IM client application, or any other event that would cause the slave client to terminate execution. If an exit condition exists in block 1062, then operation ends. However, if an exit condition does not exist, operation returns to block 1058 to determine whether a new message is received from another user.

With reference to FIG. 11, operation of an instant messaging server in a server based multiple login instant messaging system is depicted. Operation begins and the user logs into an IM client (block 1102). The IM client logs into the IM server (block 1104). The IM server determines whether the user is already logged in (block 1106). If the user is already logged into the IM server, the IM server sends the IM session history to the new client (block 1108). Next, the IM server identifies the alias of the new client (block 1110). If the user is not already logged into the IM server, operation proceeds to block 1110 to identify the alias of the client.

Thereafter, the IM server determines whether a new message is received from another user (block 1112). If a new message is received from another participant, the IM server records the message in the IM history (block 1114) and forwards the message to all clients from which the user is logged in (block 1116). Thereafter, operation proceeds to block 1124 to determine whether an exit condition exists.

If a new message is not received from another participant in block 1112, the IM server determines whether a message is received from one of the user's clients (block 1118). If the IM server receives a message from the user, the IM server records the message in the history with the identified alias associated with the client from which the message was sent (block 1120) and forwards the message to other clients from which the user is logged in, if any (block 1122). Thereafter, operation proceeds to block 1124, where the IM server determines whether an exit condition exists. On the other hand, if a message is not received form the user in block 1118, operation proceeds to block 1124 to determine whether an exit condition exists.

Turning to block 1124, an exit condition may be, for example, any other event that would cause the IM server to terminate execution. If an exit condition exists in block 1124, then operation ends. However, if an exit condition does not exist, the IM server determines whether a user logs into the IM server from a new client (block 1126). If a user logs in from a new client, operation returns to block 1106 to determine whether the user is already logged in. If a user does not log in from a new client, operation returns to block 1112 to determine whether a new message is received from another user.

Turning to FIG. 12, operation of an instant messaging proxy in a proxy based multiple login instant messaging system is depicted. Operation begins and the user logs into an IM client (block 1202). The IM client logs into the IM proxy (block 1204). The IM proxy determines whether the user is already logged in (block 1206). If the user is already logged in, the IM proxy sends the IM session history to the new client (block 1208). Next, the IM proxy identifies the alias of the new client (block 1210). If the user is not already logged in, the proxy logs the user into the IM server (block 1212) and operation proceeds to block 1210 to identify the alias of the client.

Thereafter, the IM proxy determines whether a new message is received from another user (block 1214). If a new message is received from another participant, the IM proxy records the message in the IM history (block 1216) and forwards the message to all clients from which the user is logged in (block 1218). Thereafter, operation proceeds to block 1228 to determine whether an exit condition exists.

In the depicted embodiment, the client uses an alias user ID and password to log into the proxy server. The proxy server then uses the alias user ID and password to identify the actual user ID and password to be used in communication with the IM provider.

If a new message is not received from another participant in block 1214, the IM proxy determines whether a message is received from one of the user's clients (block 1220). If the IM proxy receives a message from the user, the IM proxy records the message in the history with the identified alias associated with the client from which the message was sent (block 1222), forwards the message to other clients from which the user is logged in, if any (block 1224), and sends the message to the IM server (block 1226). Thereafter, operation proceeds to block 1228, where the IM proxy determines whether an exit condition exists. On the other hand, if a message is not received form the user in block 1220, operation proceeds to block 1228 to determine whether an exit condition exists.

Turning to block 1228, an exit condition may be, for example, any event that would cause the IM proxy to terminate execution. If an exit condition exists in block 1228, then operation ends. However, if an exit condition does not exist, the IM proxy determines whether a user logs into the IM proxy from a new client (block 1230). If a user logs in from a new client, operation returns to block 1206 to determine whether the user is already logged in. If a user does not log in from a new client, operation returns to block 1214 to determine whether a new message is received from another user.

Thus, the present invention solves the disadvantages of the prior art by providing mechanisms for allowing users to log into an IM provider from multiple clients concurrently. The messages are recorded and messages from the same users originating form multiple clients are differentiated. The user may then follow the IM session from any client device from which the user has logged into the IM provider. Also, when logging into a new client device in a session, the user is provided a history of the IM session.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, within a proxy server disposed between a first user and an instant message provider, the method comprising:
    engaging in a first instant messaging session with a first client device associated with the first user;
    engaging in a second instant messaging session with a second client device associated with the first user;
    wherein each of the first client device and the second client device respectively engage in the first and second instant messaging sessions using a unique alias; and
    recording an instant messaging history of the first and second instant messaging sessions in a common history; and
    engaging in a third instant messaging session with the instant message provider, wherein messages from both the first and second instant messaging sessions are forwarded, within the third instant messaging session, to the instant message provider under a same user name.

2. The method of claim 1, further comprising
    responsive to receiving a message from a second user to the first user, forwarding the message to the first client device and the second client device.

3. The method of claim 1, further comprising
    sending a message from the first user to a second user, using the third instant messaging session, with an indicia identifying a source client device of the first user for the message.

4. A proxy server, comprising:
    at least one processor, the at least one processor configured to perform the operations of:
    engaging in a first instant messaging session with a first client device associated with a first user;
    engaging in a second instant messaging session with a second client device associated with the first user; and
    wherein each of the first client device and the second client device respectively engage in the first and second instant messaging sessions using a unique alias;
    recording an instant messaging history of the first and second instant messaging sessions in a common history; and
    engaging in a third instant messaging session with an instant message provider, wherein messages from both the first and second instant messaging sessions are forwarded, within the third instant messaging session, to the instant message provider under a same user name.

5. The proxy server of claim 4, wherein
    the at least one processor is further configured to perform responsive to receiving a message from a second user to the first user, forwarding the message to the first client device and the second client device.

6. The proxy server of claim 4, wherein
    the at least one processor is further configured to perform sending a message from the first user to a second user, using the third instant messaging session, with an indicia identifying a source client device of the first user for the message.

7. A computer program product including a computer-readable storage memory having computer-readable program code stored thereon, the computer-readable program code, when executed by a proxy server system, causing the proxy server system to perform:
    engaging in a first instant messaging session with a first client device associated with a first user;
    engaging in a second instant messaging session with a second client device associated with the first user;
    wherein each of the first client device and the second client device respectively engage in the first and second instant messaging sessions using a unique alias;
    recording an instant messaging history of the first and second instant messaging sessions in a common history; and
    engaging in a third instant messaging session with an instant message provider, wherein messages from both the first and second instant messaging sessions are forwarded, within the third instant messaging session, to the instant message provider under a same user name.

8. The computer program product of claim 7, further comprising
    responsive to receiving a message from a second user to the first user, forwarding the message to the first client device and the second client device.

9. The computer program product of claim 7, further comprising
    sending a message from the first user to a second user, using the third instant messaging session, with an indicia identifying a source client device of the first user for the message.

* * * * *